(12) United States Patent
Gervasi et al.

(10) Patent No.: US 9,365,742 B2
(45) Date of Patent: *Jun. 14, 2016

(54) GRAFTED POLYMERS AS OLEOPHOBIC OR HYDROPHOBIC COATINGS

(71) Applicant: XEROX CORPORATION, Norwalk, CT (US)

(72) Inventors: David J. Gervasi, Pittsford, NY (US); Mandakini Kanungo, Penfield, NY (US)

(73) Assignee: XEROX CORPORATION, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/161,178

(22) Filed: Jan. 22, 2014

(65) Prior Publication Data

US 2015/0004861 A1 Jan. 1, 2015

Related U.S. Application Data

(63) Continuation-in-part of application No. 14/018,403, filed on Sep. 4, 2013, which is a continuation-in-part of application No. 13/931,983, filed on Jun. 30, 2013.

(51) Int. Cl.
| | |
|---|---|
| *C09D 171/00* | (2006.01) |
| *C08G 65/00* | (2006.01) |
| *C08G 65/333* | (2006.01) |
| *C08G 65/336* | (2006.01) |
| *C08G 65/337* | (2006.01) |

(52) U.S. Cl.
CPC ............ *C09D 171/00* (2013.01); *C08G 65/007* (2013.01); *C08G 65/336* (2013.01); *C08G 65/337* (2013.01); *C08G 65/33324* (2013.01); *C08G 2650/48* (2013.01); *Y10T 428/3154* (2015.04); *Y10T 442/2172* (2015.04)

(58) Field of Classification Search
CPC ..................................................... C09D 171/00
See application file for complete search history.

(56) References Cited

U.S. PATENT DOCUMENTS

| | | | |
|---|---|---|---|
| 4,530,969 A | 7/1985 | Moggi et al. | |
| 5,545,693 A | 8/1996 | Hung et al. | |
| 5,700,861 A * | 12/1997 | Tomihashi et al. | ........... 524/344 |
| 5,750,204 A | 5/1998 | Badesha et al. | |
| 6,209,991 B1 * | 4/2001 | Regan et al. | ..................... 347/63 |
| 8,519,078 B2 * | 8/2013 | Yamaguchi et al. | ............ 528/15 |

(Continued)

FOREIGN PATENT DOCUMENTS

| | | |
|---|---|---|
| EP | 0099079 A1 | 1/1984 |
| EP | 0507468 A2 | 10/1992 |
| JP | 58167597 A | 10/1983 |

OTHER PUBLICATIONS

Kanungo et al., "Grafted Polymers as Oleophobic Low Adhesion Anti-Wetting Coatings for Printhead Applications", U.S. Appl. No. 14/018,403, filed Sep. 4, 2013.

(Continued)

*Primary Examiner* — Nicole M Buie-Hatcher
(74) *Attorney, Agent, or Firm* — MH2 Technology Law Group LLP

(57) ABSTRACT

An article of manufacture comprising a substrate and an outer polymer coating on the substrate. The polymer coating comprises an oleophobic grafted polymer comprising a crosslinked fluoroelastomer group. A perfluorinated polyether is grafted to the crosslinked fluoroelastomer group.

20 Claims, 3 Drawing Sheets

(56) References Cited

U.S. PATENT DOCUMENTS

| | | |
|---|---|---|
| 9,056,958 B2 | 6/2015 | Kanungo et al. |
| 2003/0081063 A1 | 5/2003 | Stanton et al. |
| 2012/0103212 A1 | 5/2012 | Stowe et al. |
| 2012/0154487 A1* | 6/2012 | Sambhy et al. ............ 347/45 |
| 2012/0156481 A1 | 6/2012 | Moorlag et al. |
| 2013/0104756 A1 | 5/2013 | Stowe et al. |
| 2013/0338293 A1 | 12/2013 | Kanungo et al. |
| 2014/0060352 A1 | 3/2014 | Gervasi et al. |

OTHER PUBLICATIONS

Gervasi et al., "Imaging Member for Offset Printing Applications", U.S. Appl. No. 13/601,956, filed Aug. 31, 2012.

Kanungo et al., "Fluoroelastomers for Making System Component, Including Grafted Fluorinated Polymers", U.S. Appl. No. 13/931,983, filed Jun. 30, 2013.

* cited by examiner

GRAFTED POLYMERS AS OLEOPHOBIC OR HYDROPHOBIC COATINGS

STATEMENT OF RELATED APPLICATIONS

This application is a continuation-in-part of U.S. application Ser. No. 14/018,403, filed Sep. 4, 2013, which is a continuation-in-part of U.S. application Ser. No. 13/931,983, filed Jun. 30, 2013, the contents of both of which applications are incorporated herein by reference in their entirety.

BACKGROUND

Embodiments disclosed herein relate to coatings employed in articles of manufacture. In particular, embodiments disclosed herein relate to oleophobic anti-wetting coatings employed as outer coatings on a surface of an article of manufacture.

There has been much work in fluorinated polymers, including fluoro-elastomer based systems, which are well known for use in a variety of applications. Known low surface energy fluoropolymers are employed for water repellancy, fingerprint and smudge resistant coatings, easily cleanable coatings for electronic devices, displays or touchscreen devices, or as coatings for glass, plastic or other flexible or rigid surfaces.

However, there are a number of disadvantages of known forms of fluoroelastomer based systems. For example, many fluoroelastomers are not thermally stable, or do not exhibit a desired degree of hydrophobic or oleophobic behavior. Many conventional oleophobic low adhesion coatings tend to degrade when exposed to temperatures encountered during many high-temperature, high pressure processes, which can cause reduction or loss of the coatings hydrophobic or oleophobic properties.

Thus, there remains a need for a novel fluorinated polyester additive that can provide improved thermal stability and/or exhibit improved hydrophobic or oleophobic behavior.

SUMMARY

Figure 1:
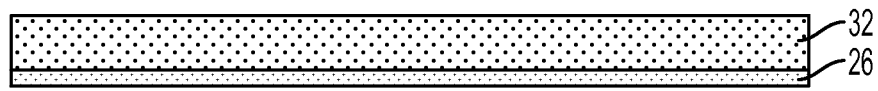
FIG. 1 shows an article of manufacture comprising an oleophobic and/or hydrophobic coating, in accordance with embodiments disclosed herein.

In an embodiment, the present disclosure is directed to an article of manufacture comprising a substrate and an outer polymer coating on the substrate. The polymer coating comprises an oleophobic grafted polymer comprising a crosslinked fluoroelastomer group. A perfluorinated polyether is grafted to the crosslinked fluoroelastomer group.

Another embodiment of the present disclosure is directed to a process for making an article of manufacture. The process comprises crosslinking a fluoroelastomer with an aminofunctionalized silane. An alkoxysilane-terminated perfluorinated polyether is grafted to the crosslinked fluoroelastomer to form a oleophobic grafted polymer. A layer of the oleophobic grafted polymer is deposited on a substrate surface. The layer is cured to form an oleophobic grafted polymer coating.

Yet another embodiment is directed to an article of manufacture comprising a surface and a polymer coating on the surface. The polymer coating comprises a compound of formula I:

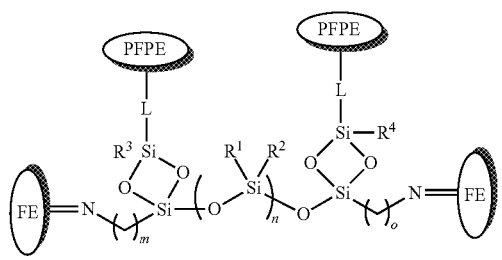

wherein FE is a fluoroelastomer group; PFPE is a perfluorinated polyether group; L is a linker; m and o are independently an integer from 3 to 8; n is an integer from 1 to 10; each incidence of $R^1$ and $R^2$ is independently a substituted or unsubstituted $C_1$-$C_6$ alkyl, and $R^3$ and $R^4$ are independently an optionally fluorinated $C_1$-$C_6$ alkyl or an optionally fluorinated $C_1$-$C_6$ alkoxy.

DETAILED DESCRIPTION

Embodiments disclosed herein can provide thermally stable, mechanically robust, and/or low adhesion coatings based on oleophobic and hydrophobic grafted polymers prepared by grafting crosslinked fluoroelastomers with perfluoropolyethers The oleophobic grafted polymers may exhibit advantageous and/or complementary chemistry relative to polyurethane based coatings. In embodiments, the oleophobic grafted polymers employed as coatings may be particularly useful in high definition (HD) piezo printhead applications where the coating is applied on the printhead front face. Coatings (or films) of the oleophobic grafted polymers disclosed herein may exhibit high ink contact angles (greater than 50 degrees) and low sliding angles (less than 30 degrees) while having excellent thermal stability. In contrast to other coatings in the art, the oleophobic grafted polymers disclosed herein may produce little to no oil on the surface of the coating after curing. Moreover, such coatings may also exhibit minimal thickness and mass loss after exposure to temperatures in excess of 290° C., making them suitable for use under stringent printhead fabrication conditions. Coatings employing the oleophobic grafted polymers disclosed herein are robust and may have a long shelf life even when subjected to continual exposure to temperatures of about 140° C. in molten ink for 2 days. The oleophobic grafted polymer coatings can be used with solid inks, pigmented inks and UV inks, and can enable good performance under high drool pressure while demonstrating easy clean and self-cleaning properties. Finally, the oleophobic grafted polymers can be formed into the requisite coatings by simple flow coating techniques, facilitating printhead manufacture. These and other advantages will be apparent to those skilled in the art.

In some embodiments, there are provided oleophobic grafted polymers comprising a crosslinked fluoroelastomer and a perfluorinated polyether grafted to the crosslinked fluoroelastomer.

As used herein, the term "oleophobic" when used in conjunction with the grafted polymers, refers to the physical property of the grafted polymers to repel oils, hydrocarbons, and more generally organic compounds, especially non-polar organic compounds. Oleophobic character imparts anti-wetting properties that are useful to repel wetting. The oleophobic character can provide the coatings with good contact angle and sliding angle characteristics.

As used herein, the term "grafted polymer" refers to the chemical joining of two or more pre-fabricated polymers. Grafting can be viewed as a form of polymer crosslinking. For example, a graft polymer disclosed herein may be prepared by reacting a pre-fabricated fluoroelastomer with a pre-fabricated perfluorinated polyether with the aid of a crosslinking agent. In embodiments, the crosslinker employed to crosslink the fluoroelastomer serves a dual role by providing a point of attachment for the graft chemistry to attach the perfluorinated polyether.

As used herein, the term "fluoroelastomer" refers to any material generally classified as an elastomer and containing a substantial degree of fluorination. Fluoroelastomers are synthetic fluorine-containing rubberlike polymers (typically copolymers/terpolymers) characterized by high thermal stability, nonflammability, and resistance to corrosive media. In embodiments, the fluoroelastomer (FE) has a fluorine content of at least about 65 percent. In embodiments the fluorine content may be in a range from about 50 to about 90 percent, or about 60 to near 100 percent. Exemplary commercial fluoroelastomers generally have a fluorine content in a range from about 66 to about 70 percent.

Fluoroelastomers currently known and available include copolymers of vinylidene fluoride and hexafluoropropylene, terpolymers of vinylidene fluoride, hexafluoropropylene and tetrafluoroethylene, and alternating copolymers of propylene and tetrafluoroethylene. Such fluoroelastomers are available commercially as VITON™ (Dupont), DYNEON™ (3M), FLUOREL™ (3M), AFLAS™ (3M), and TECNOFLON™ (Solvay Solexis) classes of products. Such fluoroelastomers may exhibit excellent solvent and oil resistance and also have a relatively high temperature resistance compared to their non-fluorinated elastomer counterparts. In embodiments, the fluoroelastomer (FE) may be a polymer comprising a monomer unit selected from the group consisting of vinylidene fluoride, tetrafluorethylene, hexafluoropropylene, perfluoromethylvinylether and combinations thereof. In some such embodiments, the fluoroelastomer is a terpolymer of vinylidene fluoride, tetrafluorethylene, and hexafluoropropylene.

In embodiments, the fluoroelastomer (FE) has a molecular weight in a range from about 50,000 to about 70,000 daltons as measured by gel permeation chromatography. In embodiments the fluoroelastomer may be selected based on its tensile strength. In some such embodiments, the tensile strength of the fluoroelastomer may be in a range from about 15 mPa to about 25 mPa, or about 20 to about 25 mPa, or about 22 mPa to about 25 mPa, as measured by the standard ASTM D412C. In embodiments, the fluoroelastomer is selected particularly for its ability to participate in crosslinking chemistry as disclosed herein.

As used herein, a perfluorinated polyether refers to a polyether polymer having a substantial degree of fluorine substitution, and may be any fluorinated oligomer, homopolymer, or copolymer. Perfluorinated polyethers may exhibit comparable chemical stability to fluoroelastomers and may exhibit similar properties. In embodiments, the perfluorinated polyether (PFPE) is an alkoxysilane-terminated perfluorinated polyether having an average molecular weight in a range from about 1,500 daltons to about 2,500 daltons. Perfluorinated polyethers may be selected for their ability to bond to silanols, while having similar solvent repellent properties as the fluoroelastomers. Moreover, the perfluorinated polyether component may be selected to confer good abrasion resistance to the oleophobic grafted polymers.

Suitable perfluorinated polyethers include those of the FLUOROLINK™ (Solvay Solexis) class. In particular embodiments, the perfluorinated polyether may be bifunctionally substituted with a linker (L) terminating in an alkoxysilane as in the compound of general formula II:

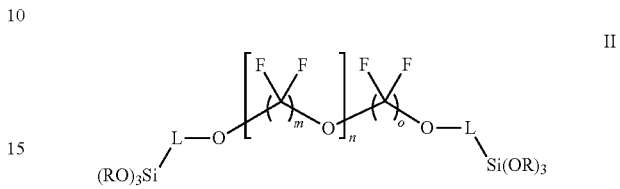

Terminal alkoxysilane groups provide a chemical handle for downstream grafting chemistry, in accordance with embodiments disclosed herein. The grafting chemistry of the alkoxysilane group may be accomplished with a substrate bearing a hydroxyl group, such as an organic alcohol or a silanol. Silanol coupling partners provide access to siloxane products (Si—O—Si), such as the oleophobic grafted polymers disclosed herein. The linker (L) employed in compounds of formula II may comprise any substituted or unsubstituted $C_1$-$C_6$ alkyl, including fluorinated alkyls, such as perfluorinated alkyls. Linker L may also comprise any competent organic functional group to attach to the main perfluorinated polyether chain at a terminal oxygen, or in some embodiments, at a terminal carbon atom. Non-limiting functional groups for attachment to oxygen include carbamates, esters, ethers, amides and the like. The R groups of the alkyoxysilane moiety (Si(OR)$_3$) may be the same or different. R may include methyl, ethyl, n-propyl, or isopropyl any of which may be substituted, including substitution with fluorine. R may also be hydrogen. In some embodiments, R is hydrogen after a hydrolysis step in preparation for grafting chemistry. In formula II, m, n, and o are integers that are selected based on the target molecular weight, as described above. In embodiments, m and o are integers from 2 to 8. In embodiments, n is an integer from 2 to 4.

In embodiments, the oleophobic grafted polymers disclosed herein may be compounds of formula I:

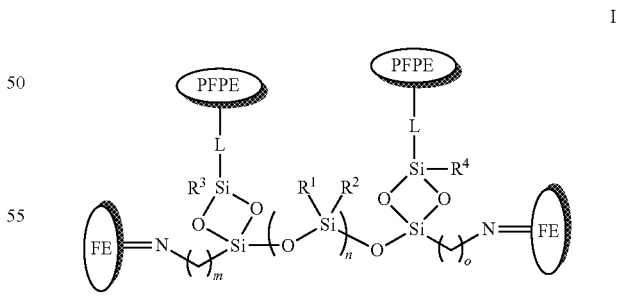

wherein FE is a fluoroelastomer group,
PFPE is a perfluorinated polyether group,
L is a linker,
m, n, and o are independently an integer from 1 to 10;
each incidence of $R^1$ and $R^2$ is independently an optionally fluorinated $C_1$-$C_6$ alkyl; and
$R^3$ and $R^4$ are independently an optionally fluorinated $C_1$-$C_6$ alkyl or an optionally fluorinated $C_1$-$C_6$ alkoxy.

In embodiments, m and o are independently an integer from 3 to 8 and n is an integer from 1 to 10. In embodiments, the linker L comprises a $C_1$-$C_6$ alkyl terminating in a functional group capable of covalently linking to a terminal hydroxyl functionality group of the perfluorinated polyether, as described above.

The $C_1$-$C_6$ alkyl or $C_1$-$C_6$ alkoxy groups for $R^3$, $R^4$ and/or L may be straight chain or branched. In embodiments, any of the alkyl or alkoxy groups may be optionally substituted, including substitution with halogens other than fluorine, such as chlorine or bromine. One skilled in the art will recognize that because structure I is polymeric, not every site where the perfluorinated polyether is shown in structure I may actually be so substituted. Thus, in embodiments, the printhead coatings disclosed herein may comprise a mixture of structure I and structure III:

III

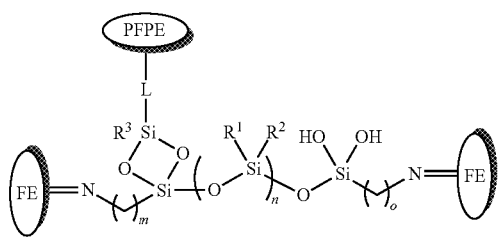

where each of the groups are defined as set forth above. In embodiments, structure III may be a minor component and present at less than about 10 percent, or less than about 5 percent, or less than about 1 percent by weight of the coating composition. In some embodiments, compounds of structure III, where present, may have the latent silanol groups capped. For example, they may be capped as alkoxy groups by treatment with an alkylating agent.

Compounds of formula I comprise the fluorelastomers (FE) and perfluorinated polyethers (PFPE) described herein above. The two polymer types are brought together with the aid of a crosslinker. The crosslinker may be used to first crosslink the fluoroelastomer with itself. In embodiments, the fluoroelastomer is crosslinked with an aminofunctionalized silane. In embodiments, the aminofunctionalized silane also provides the graft attachment point for the perfluorinated polyether, as indicated in the structure I. In embodiments, the aminofunctionalized silane may be based on end-capping of a polysiloxane (or just siloxane where n=1 in structures I and III) with 3-aminopropyl trimethoxy silane (AO800, available from UCT, Bristol, Pa.). One skilled in the art will appreciate that the crosslinking agent may itself include a high degree of fluorination, although this is not necessary.

In some embodiments, there are provided processes for making an oleophobic grafted polymer comprising crosslinking a fluoroelastomer with an aminofunctionalized silane and grafting an alkoxysilane-terminated perfluorinated polyether to the crosslinked fluoroelastomer. In some such embodiments, the oleophobic grafted polymer accessed by such a process may comprise the compound of structure I, described above. In embodiments, the crosslinking step may be performed in the presence of the alkoxysilane-terminated perfluorinated polyether. Without being bound by theory, it is expected that the crosslinking of fluoroelastomer comprising hydrogen atoms in the backbone may allow the fluoroelastomer to be dehydrofluorinated as indicated in Step 1 of reaction Scheme 1 below. Dehydrofluorination provides an unsaturated fluoroelastomer intermediate and a protonated aminofunctionalized crosslinker. Regeneration of the amine with base (Step 2) and subsequent amine addition across the unsaturation (Step 3) provides a crosslinked fluoroelastomer which is ready to be grafted with the perfluorinated polyether. The grafting (Step 4) may be accomplished by hydrolyzing the alkoxy groups of the alkoxysilanes on the crosslinker and/or the alkoxysilane terminated perfluorinated polyether to provide the compounds of structure I. Thus, to clarify, the "perfluorinated polyether" groups in the Formula 1 Example shown in step 4 of Scheme 1 below are alkoxysilane terminated.

Scheme 1: Crosslinking reaction of a fluoroelastomer with an alkoxysilane terminated perfluorinated polyether using an aminofunctionalized fluorosilicone as a crosslinker.

Step 1: (Dehydrofluorination)

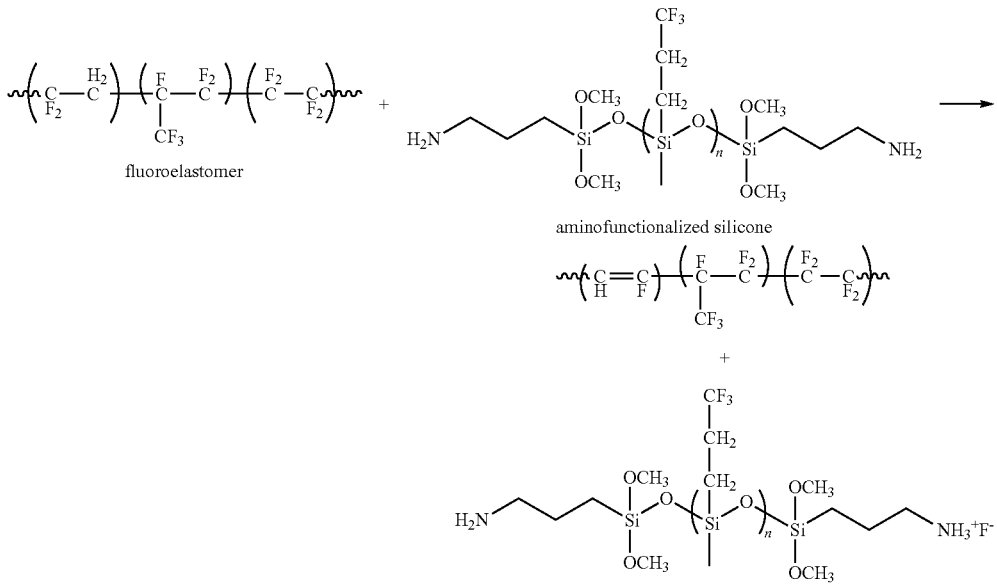

Step 2: (Regeneration of amine)
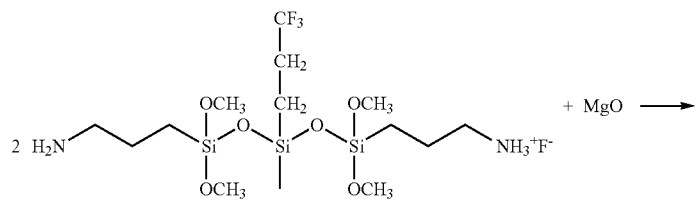
+ MgO ⟶
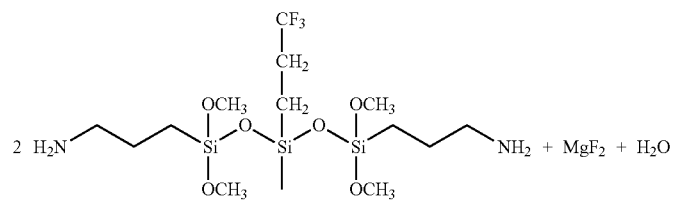
+ MgF$_2$ + H$_2$O
Step 3: (Addition of amine across the double bond)
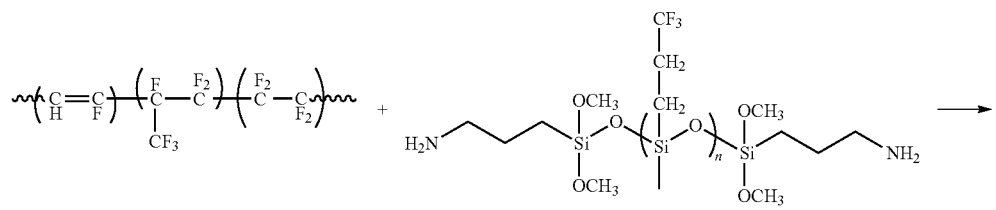
⟶
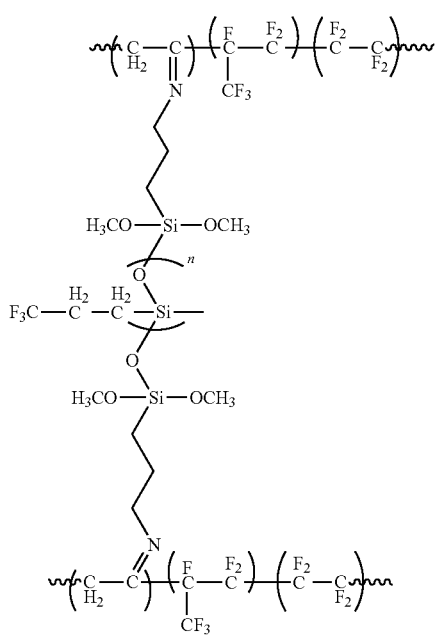
crosslinked fluoroelastomer Step 4: (Hydrolysis and condensation)

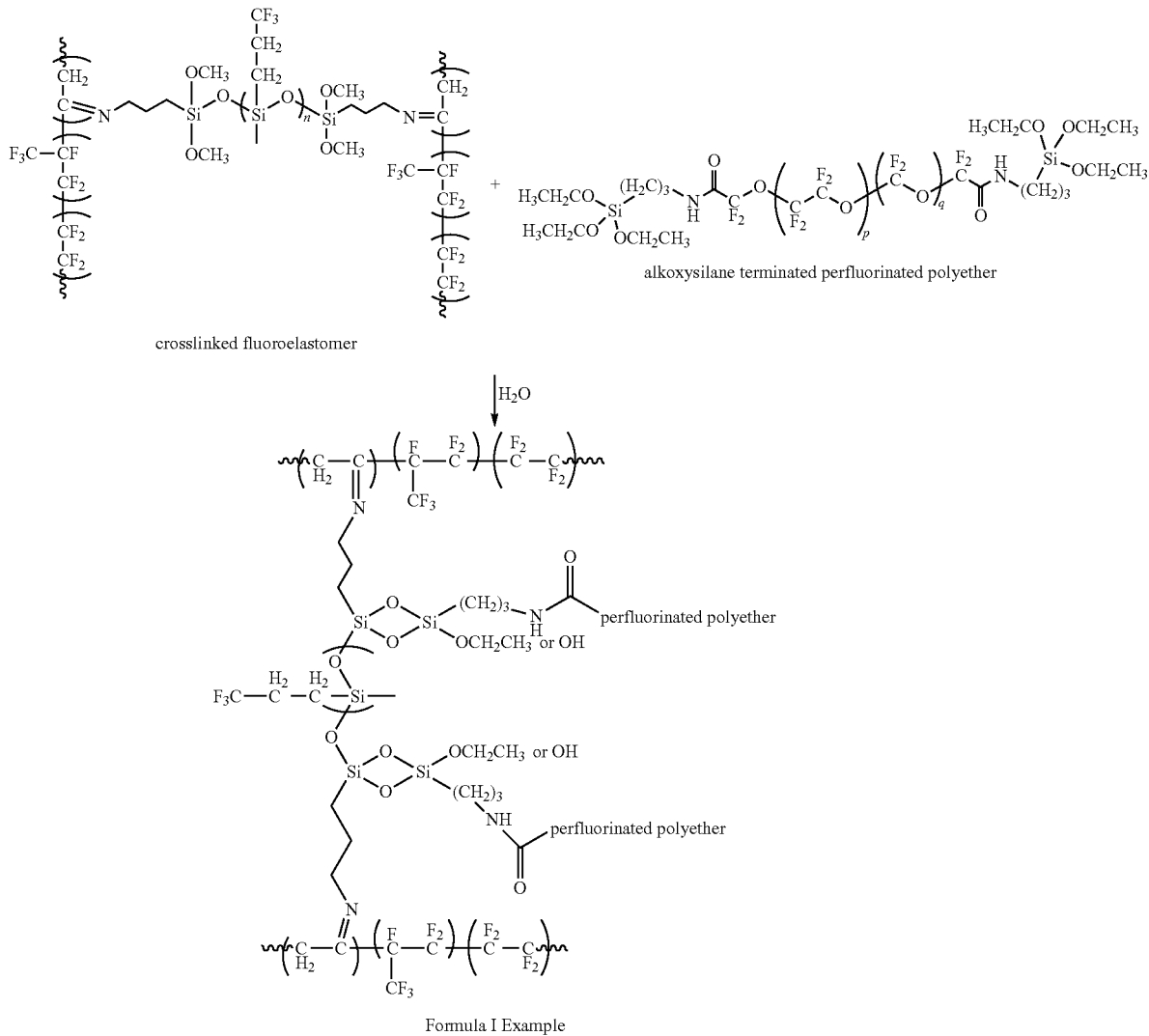

Formula I Example

As described above, the fluoroelastomer crosslinking step may be carried out in the presence of the perfluorinated polyether. In some such embodiments, a ratio of the aminofunctionalized silane to the alkoxysilane-terminated perfluorinated polyether is in a range from about 0.5:1 to about 3:1, or about 1:1 to about 2:1. In some embodiments, the ratio may be about 1.5:1. In embodiments, an amount of the aminofunctionalized silane relative to the fluoroelastomer is in a range from about 2 pph to about 10 pph. In embodiments, the attachment of the aminefunctionalized crosslinker with the perfluorinated polyether may be carried out before the crosslinking of the fluoroelastomer. Any of the steps describe above may be carried out with the aid of a catalyst and reactions may be optionally carried out at elevated temperatures. Typically, the reactions will be run in an organic solvent, such as methyl isobutyl ketone (MIBK). In embodiments, the reactions are all run in a one-pot sequence without isolation of chemical intermediates. In embodiments, the reaction product is used directly to form a coating with or without any type of purification.

In some embodiments, there are provided articles of manufacture comprising a front face having a polymer coating, the polymer coating comprising an oleophobic grafted polymer comprising a crosslinked fluoroelastomer and a perfluorinated polyether grafted to the crosslinked fluoroelastomer. In some such embodiments, the oleophobic grafted polymer comprises the compound of structure I.

The oleophobic low adhesion surface coating disclosed herein can be employed as an anti-wetting coating for any article of manufacture on which such coatings are considered beneficial. In some embodiments, the article of manufacture comprises an oleophobic low adhesion surface coating comprising an oleophobic low adhesion polymeric material wherein hexadecane exhibits a contact angle with the surface coating that is greater than about 50 degrees. In some embodiments, the contact angle is greater than about 55, or greater than about 65 degrees. In one embodiment, there is no upper limit to the contact angle exhibited between the hexadecane and the surface coating. In another embodiment, the contact angle is less than about 150 degrees, or less than about 90 degrees. In some embodiments, the coatings provide, in combination, low adhesion and high contact angle. In some embodiments, the coatings herein provide a low sliding angle of less than about 30 degrees. In some embodiments, the sliding angle is less than about 25 degrees. In some embodiments, the sliding angle is greater than about 1 degree. Contact angle is largely insensitive to drop size. However, contact angle can be measured upon disposing 5-10 microliter drops of hexadecane onto the surface coating. Sliding angle can be measured upon disposing 7-12 microliter drops of hexadecane onto the surface coating.

In embodiments described herein, the oleophobic low adhesion coatings are thermally stable, thereby providing a low sliding angle in a range from about 1 degree to about 30 degrees and a high contact angle in a range from about 45 degrees to about 150 degrees even after exposure to high temperatures (e.g., temperatures in a range from about 180° C. to about 325° C.) and high pressures (e.g., pressures in a range from about 100 psi to about 400 psi) for extended periods of time (e.g., periods of time in a range from about 10 minutes to about 2 hours). In one embodiment, the oleophobic low adhesion coating is thermally stable after being exposed to a temperature of about 290° C. at pressures of about 350 psi for about 30 minutes. This can be beneficial for articles of manufacture that require a high temperature and/or high pressure step as part of their fabrication process. The oleophobic low adhesion coating 26 can provide a thermally stable, self-cleaning surface.

Referring to FIG. 1, the articles of manufacture of the present disclosure can be made by forming an oleophobic low adhesion coating, such as oleophobic low adhesion coating 26 on a substrate 32. The substrate 32 may be formed of any suitable material that can benefit from a low surface energy fluoropolymer coating to provide, for example, water repellancy, fingerprint and smudge resistance or easily cleanable coatings. For example, substrate 32 can comprise a glass surface, metal surface, plastic surface, ceramic surface, textile surface or other flexible or rigid surface on which coating 26 can be deposited.

In an embodiment, the substrate 32 can be a portion of electronic device, such as a display, device case or an electronic component of a device For example, substrate 32 can be a screen, such as television screen, computer screen, cell phone screen or electronic tablet screen, an outer case for a cell phone, electronic tablet, laptop or other electronic device casing, or an integrated circuit chip on which the coating 26 can be applied as a final passivation layer or as a coating layer used for packaging of the integrated circuit chip. In yet other examples, substrate 32 can be any other article of manufacture that can benefit from a hydrophobic or oleophobic coating, such as: as an article of clothing; furniture having a plastic or woven textile surface; outdoor gear, such as tent fabric or other fabric used for outdoor shelters, sleeping bag fabric or lawn furniture fabric; glass articles, such as window glass, microwave glass, oven glass or wind shields for automobiles; automobile furnishings, such as dashboards or car seats; home appliances, such as outer surfaces of dishwashers, oven ranges, refrigerators or microwaves, including electronic control panels or any other metal, plastic or glass outer coverings or casings of such appliances that can benefit from the coatings of the present disclosure.

In one embodiment, the oleophobic low adhesion coating 26 may be formed on the substrate 32 by initially applying the reactant mixture that, as described above, includes at least one isocyanate and at least one perfluoropolyether compound. After the reactant mixture is applied to the substrate 32, the reactants are reacted together to form the oleophobic low adhesion coating 26. The reactants can be reacted together by, for example, curing the reactant mixture. In one embodiment, the reactant mixture is first cured at a temperature of about 130° C. for about 30 minutes to about 2 hours followed by a high temperature post-cure at about 290° C. for about 30 minutes to about 2 hours.

In one embodiment, the reactant mixture may be applied to the substrate 32 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 32 with a uniform (or substantially uniform) amount of the reactant mixture. The use of a doctor blade is another technique that can be employed to apply the reactant mixture. In flow coating, a programmable dispenser is used to apply the reactant mixture.

EXAMPLES

Synthesis of an Oleophobic Grafted Polymer (A).

Figure 2:
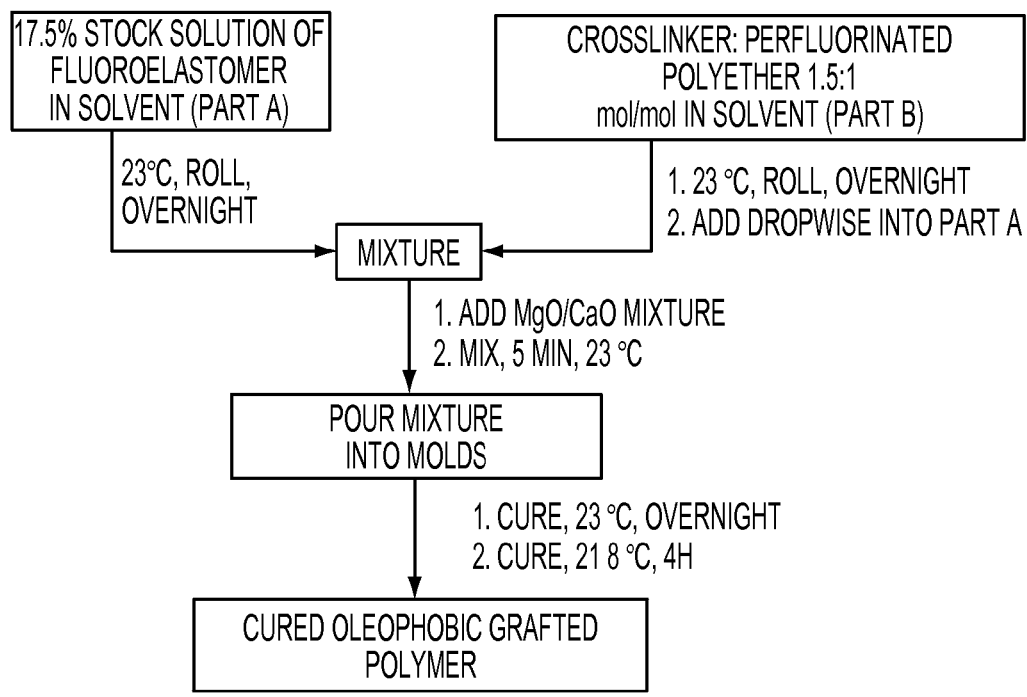
FIG. 2 shows a synthetic procedure for making grafts, according to an embodiment of the present disclosure.
Figure 3:
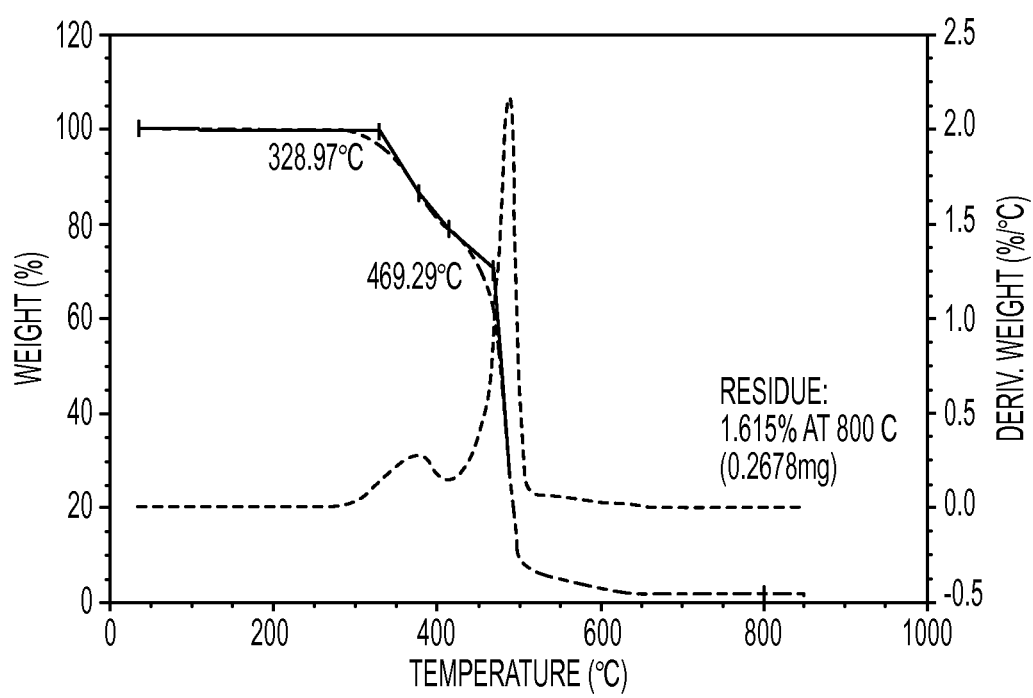
FIG. 3 shows a thermogravimetric analysis (TGA) profile of an exemplary oleophobic grafted polymer, in accordance with embodiments disclosed herein. The TGA analysis indicates that the coating is thermally stable up to about 330° C. without weight loss.

Referring to FIG. 2, a 17.5% solution of a fluoroelastomer (TECNOFLON® FKM (P 959), Solvay Specialty Polymers, Alpharetta, Ga.) was made by dissolving in methyl isobutyl ketone (MIBK) and about 1 pph by weight FC4430 (3M) and AKF 290 (Wacker). (Without being bound by theory, it is believed that the surfactant may impart compatibility between the fluoroelastomer and the release layer/oil applied on fuser and it prevents pin holes/fish eye defect.) Next, an amino crosslinker and FLUORLINK™ S10 (Solvay Specialty Polymers, Alpharetta, Ga.) with a mole ratio of 1.5:1 in MIBK were mixed and rolled overnight. It has been observed that keeping the mole ratio constant and increasing the amount of crosslinker and FLUORLINK™ S10 proportionally results in improved low adhesion properties. In this Example, three different formulations were tried with (1) crosslinker: and FLUORLINK™ S10 (0.86 mM:0.57 mM) (2) crosslinker: and FLUORLINK™ S10 (1.71 mM:1.13 mM) (3) crosslinker: and FLUORLINK™ S10 (2.56 mM:1.70 mM. After 16-18 h, Part B was added into Part A dropwise, as indicated in FIG. 2. Once the addition of Part B to Part A was done, MgO/CaO (9% stock solution in MIBK mixture in the sol was added and the mixture shaked vigorously for five minutes using a devil shaker and the resulting mixture was poured into molds (6×6 inch) and kept at room temperature for 16-18 h. Part of the solution was draw bar coated on a polyimide substrate for surface property measurement. Those were cured at room temperature for overnight and transferred to an oven which was kept at 218° C. for 4 hours. Formulation (3) with increased amount of EF:FSL10 provided the best surface properties and was further evaluated for anti-wetting coating application Characterization of the Oleophobic Grafted Polymer:

TGA decomposition profile in air shows the coatings are stable until 330° C. (FIG. 3). Coatings were evaluated for surface properties towards hexadecane (which can be used as a surrogate for oil) and solid ink. Results are shown in Table 1 below.

TABLE 1

| Coating | Contact Angle (Sliding Angle) hexadecane (degree) | | | Contact Angle (Sliding Angle) solid ink (degree) | | |
|---|---|---|---|---|---|---|
| | Initial (after curing) | Stacking 290° C./ 350 psi/ 30 min | Stacking + 2 day Inking at 140° C. | Initial (after curing) | Stacking 290° C./ 350 psi/ 30 min | Stacking + 2 day Inking at 140° C. |
| Example (A) | 64 (12-15) | 63 (20-23) | 63 (25-27) | 68 (15-19) | 66 (24-28) | 64 (32-35) |
| Control Coating | 65 (7-11) | 63 (13-15) | N.A. | 71 (10) | 68 (15) | 60 (20) |

As can be seen, the surface properties are comparable to the current control coating. These coatings maintained high contact angles after stacking conditions (290° C./350 PSI with Teflon coverlay) which simulates press adhesive bonding cycles employed during printhead fabrication. Also stacked coatings maintained high contact angle after 2 days at 140° C. with molten CYMK ink. The sliding angles were somewhat higher than a control, but the ink slid cleanly from the surface and it is believed to be sufficiently low to enable easy cleaning in use. In addition, this exemplary oleophobic grafted polymer is expected to have the mechanical robustness desired for the long term performance of these coatings. These coatings can be scaled up through flow coating procedures and the demonstration of the flow coating using these grafted polymers has been accomplished.

The fact that these coatings show no oil and have very high thermal stability while maintaining the desired surface properties makes them attractive options for anti-wetting coatings for high definition piezo print applications.

What is claimed is:

1. An article of manufacture comprising:
   a substrate; and
   an outer polymer coating on the substrate, the polymer coating comprising an oleophobic grafted polymer comprising,
   a crosslinked fluoroelastomer group; and
   a perfluorinated polyether grafted to the crosslinked fluoroelastomer group,
   wherein the crosslinked fluoroelastomer group is crosslinked with an aminofunctionalized silane, the aminofunctionalized silane comprising an aminoalkylsilane-modified polysiloxane.

2. The article of manufacture of claim 1, wherein the oleophobic grafted polymer comprises polymer units of formula I:

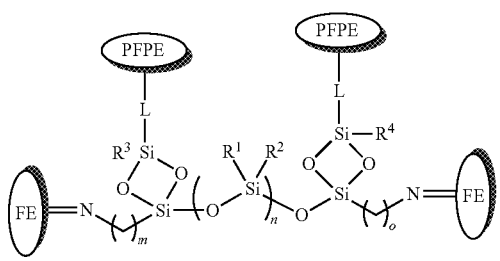

wherein FE is a fluoroelastomer group;
PFPE is a perfluorinated polyether group;
L is a linker;
m, n, and o are independently an integer from 1 to 10;
each incidence of $R^1$ and $R^2$ is independently a substituted or unsubstituted $C_1$-$C_6$ alkyl; and
$R^3$ and $R^4$ are independently an optionally fluorinated $C_1$-$C_6$ alkyl or an optionally fluorinated $C_1$-$C_6$ alkoxy.

3. The article of manufacture of claim 2, wherein the perfluorinated polyether (PFPE) group is an alkoxysilane-terminated perfluorinated polyether group.

4. The article of manufacture of claim 1, wherein the substrate comprises a surface on which the outer polymer coating is formed, the surface being selected from the group consisting of a glass surface, a metal surface, a plastic surface, a ceramic surface and a textile surface.

5. The article of manufacture of claim 1, wherein the substrate is a portion of an electronic device, a textile, a glass article, an automobile furnishing or a home appliance.

6. A process for making an article of manufacture, the process comprising:
   crosslinking a fluoroelastomer with an aminofunctionalized silane;
   grafting an alkoxysilane-terminated perfluorinated polyether to the crosslinked fluoroelastomer to form a oleophobic grafted polymer;
   depositing a layer of the oleophobic grafted polymer on a substrate surface; and
   curing the layer to form an oleophobic grafted polymer coating,
   wherein the aminofunctionalized silane comprises an aminoalkylsilane-modified polysiloxane.

7. The process of claim 6, wherein the oleophobic grafted polymer coating has a final structure comprising polymer units of formula I:

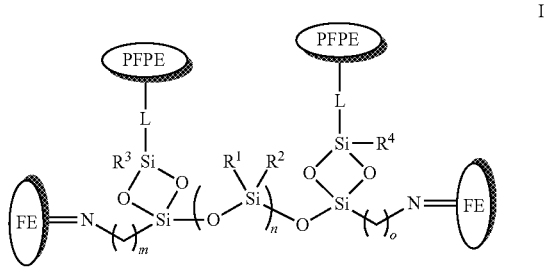

wherein FE is a fluoroelastomer group;
PFPE is a perfluorinated polyether group;
L is a linker;
m, n, and o are independently an integer from 1 to 10;
each incidence of $R^1$ and $R^2$ is independently an optionally fluorinated $C_1$-$C_6$ alkyl; and
$R^3$ and $R^4$ are independently an optionally fluorinated $C_1$-$C_6$ alkyl or an optionally fluorinated $C_1$-$C_6$ alkoxy.

8. The process of claim 6, wherein the crosslinking step is performed in the presence of the alkoxysilane-terminated perfluorinated polyether.

9. The process of claim 8, wherein a ratio of the aminofunctionalized silane to the alkoxysilane-terminated perfluorinated polyether is in a range from about 0.5:1 to about 3:1.

10. The process of claim 9, wherein an amount of the aminofunctionalized silane relative to the fluoroelastomer is in a range from about 2 pph to about 10 pph.

11. An article of manufacture comprising a surface and a polymer coating on the surface, the polymer coating comprising a compound that comprises polymer units of formula I:

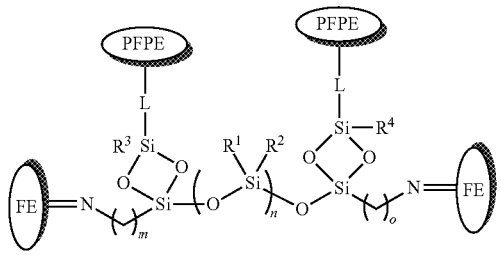

wherein FE is a fluoroelastomer group;
PFPE is a perfluorinated polyether group;
L is a linker;
m and o are independently an integer from 3 to 8;
n is an integer from 1 to 10;
each incidence of $R^1$ and $R^2$ is independently a substituted or unsubstituted $C_1$-$C_6$ alkyl; and
$R^3$ and $R^4$ are independently an optionally fluorinated $C_1$-$C_6$ alkyl or an optionally fluorinated $C_1$-$C_6$ alkoxy.

12. The article of manufacture of claim 11, wherein L comprises a $C_1$-$C_6$ alkyl terminating in a functional group capable of covalently linking to a terminal hydroxyl functionality group of the perfluorinated polyether.

13. The article of manufacture of claim 11, wherein the fluoroelastomer (FE) group is a polymer comprising a monomer unit selected from the group consisting of vinylidene fluoride, tetrafluorethylene, hexafluoropropylene, perfluoromethylvinylether and combinations thereof.

14. The article of manufacture of claim 11, wherein the fluoroelastomer (FE) group has a fluorine content of at least about 65 percent.

15. The article of manufacture of claim 11, wherein the fluoroelastomer (FE) group has a molecular weight in a range from about 50,000 to about 70,0000 daltons as measured by gel permeation chromatography.

16. The article of manufacture of claim 11, wherein the perfluorinated polyether (PFPE) is an alkoxysilane-terminated perfluorinated polyether having an average molecular weight in a range from about 1,500 daltons to about 2,500 daltons.

17. The article of manufacture of claim 11, wherein the polymer coating has an hexadecane contact angle of at least about 50 degrees and a hexadecane slide angle of less than about 30 degrees, the polymer coating being thermally stable at 290° C. at 350 psi.

18. The article of manufacture of claim 11, wherein the article of manufacture is an electronic device.

19. The article of manufacture of claim 11, wherein the surface is selected from the group consisting of a glass surface, a metal surface, a plastic surface, a ceramic surface and a textile surface.

20. The article of manufacture of claim 11, wherein the article of manufacture is a textile, a glass article, an automobile furnishing or a home appliance.

* * * * *